US007001590B1

(12) United States Patent
Angeletakis

(10) Patent No.: US 7,001,590 B1
(45) Date of Patent: Feb. 21, 2006

(54) METATHESIS-CURABLE COMPOSITION

(75) Inventor: Christos Angeletakis, Orange, CA (US)

(73) Assignee: Kerr Corporation, Orange, CA (US)

( * ) Notice: Subject to any disclaimer, the term of this patent is extended or adjusted under 35 U.S.C. 154(b) by 0 days.

(21) Appl. No.: 10/988,881

(22) Filed: Nov. 15, 2004

(51) Int. Cl.
- A61K 7/16 (2006.01)
- C08L 83/05 (2006.01)
- C08L 5/24 (2006.01)
- C08L 3/34 (2006.01)

(52) U.S. Cl. .................. 424/49; 523/107; 523/109; 524/264; 524/448

(58) Field of Classification Search .............. 424/49; 523/107, 109; 524/264, 448
See application file for complete search history.

(56) References Cited

U.S. PATENT DOCUMENTS

| | | | |
|---|---|---|---|
| 4,584,425 A | 4/1986 | Tom | 585/827 |
| 4,717,498 A | 1/1988 | Maxon | 252/174.15 |
| 4,849,127 A | 7/1989 | Maxon | 252/174.15 |
| 5,198,511 A | 3/1993 | Brown-Wensley et al. | 526/113 |
| 5,266,670 A | 11/1993 | Nakos et al. | 528/32 |
| 5,296,566 A | 3/1994 | Brown-Wensley et al. | 526/171 |
| 5,312,881 A | 5/1994 | Marks et al. | 526/126 |
| 5,330,948 A | 7/1994 | Marks et al. | 502/104 |
| 5,455,317 A | 10/1995 | Marks et al. | 526/126 |
| 5,491,206 A | 2/1996 | Brown-Wensley et al. | 526/126 |
| 5,728,785 A | 3/1998 | Grubbs et al. | 526/142 |
| 5,831,108 A | 11/1998 | Grubbs et al. | 556/21 |
| 5,939,504 A | 8/1999 | Woodson, Jr. et al. | 526/145 |
| 5,942,638 A | 8/1999 | Lichtenhan et al. | 556/460 |
| 6,001,909 A | 12/1999 | Setiabudi | 524/265 |
| 6,040,363 A | 3/2000 | Warner et al. | 523/214 |
| 6,071,459 A | 6/2000 | Warner et al. | 264/311 |
| 6,075,068 A | 6/2000 | Bissinger | 523/116 |
| 6,077,805 A | 6/2000 | Van Der Schaaf et al. | 502/155 |
| 6,121,362 A | 9/2000 | Wanek et al. | 524/448 |
| 6,252,101 B1 | 6/2001 | Herzig et al. | 556/453 |
| 6,306,987 B1 | 10/2001 | Van Der Schaaf et al. | 526/171 |
| 6,310,121 B1 | 10/2001 | Woodson, Jr et al. | 524/32 |
| 6,323,296 B1 | 11/2001 | Warner et al. | 526/171 |
| 6,403,522 B1 | 6/2002 | Bolm et al. | 502/155 |
| 6,407,190 B1 | 6/2002 | Van Der Schaaf et al. | 526/171 |
| 6,409,875 B1 | 6/2002 | Giardello et al. | 156/334 |
| 6,410,666 B1 | 6/2002 | Grubbs et al. | 526/171 |
| 6,417,363 B1 | 7/2002 | Van Der Schaaf et al. | 546/6 |
| 6,455,029 B1 * | 9/2002 | Angeletakis et al. | 424/49 |
| 6,465,554 B1 | 10/2002 | Van Der Schaaf et al. | 524/403 |
| 6,521,799 B1 | 2/2003 | Wagener et al. | 568/852 |
| 6,525,125 B1 | 2/2003 | Giardello et al. | 524/439 |
| 6,620,955 B1 | 9/2003 | Pederson et al. | 556/21 |
| 6,649,146 B1 * | 11/2003 | Angeletakis et al. | 424/49 |
| 6,794,534 B1 | 9/2004 | Grubbs et al. | 560/205 |
| 6,818,586 B1 | 11/2004 | Grubbs et al. | 502/155 |
| 2002/0107138 A1 | 8/2002 | Hoveyda et al. | 502/152 |
| 2002/0153096 A1 | 10/2002 | Giardello et al. | 156/334 |
| 2002/0185630 A1 | 12/2002 | Piccinelli et al. | 252/184 |

FOREIGN PATENT DOCUMENTS

| | | |
|---|---|---|
| DE | 19859191 | 6/2000 |
| EP | 0796607 | 9/1997 |
| EP | 0771830 | 12/1999 |
| EP | 1025830 | 9/2000 |
| EP | 0940405 | 6/2001 |
| EP | 1241196 | 9/2002 |
| JP | 2001002719 | 1/2001 |
| JP | 2002284789 | 10/2002 |
| WO | WO 98/39346 | 9/1998 |
| WO | WO 99/00396 | 1/1999 |
| WO | WO 99/00397 | 1/1999 |
| WO | WO 99/29701 | 6/1999 |
| WO | WO 99/50330 | 10/1999 |
| WO | WO 99/60030 | 11/1999 |
| WO | WO 00/46255 | 8/2000 |

OTHER PUBLICATIONS

International Organization for Standardization, *Dental Elastomeric Impression Materials*, ISO 4823 (1992).

Scholl et al., *Synthesis and Activity of a New Generation of Ruthenium-Based Olefin Metathesis Catalysts Coordinated with 1,3-Dimesityl-4,5-dihydroimidazol-2-ylidene Ligands*, Org. Lett., vol. 1, No. 6, 953-956 (1999).

Chevalier et al., *Ring-Opening Olefin Metathesis Polymerisation (ROMP) as a Potential Cross-Linking Mechanism for Siloxane Polymers*, J. of Inorganic and Organometallic Polymers, vol. 9, No. 3, 151-164 (1999).

L. LeCamp et al., *Polydimethyl siloxane photoreticulable par vole cationique-I*, Eur. Polym. J. vol. 33, No. 9, pp. 1453-1462 (1997).

Kim et al., *Surface-Initiated Ring-Opening Metathesis Polymerization on Si/SiO2*, Macromolecules 2000, 33(8), 2793-2795.

* cited by examiner

*Primary Examiner*—Robert D. Harlan
(74) *Attorney, Agent, or Firm*—Wood, Herron & Evans, LLP

(57) ABSTRACT

One-part and two-part compositions curable by a metathesis reaction comprising a resin containing a substrate with at least two cycloolefin groups per molecule curable by a metathesis reaction with a metathesis catalyst. These compositions may optionally contain a reaction control agent for slowing the progress of the metathesis reaction. The metathesis catalyst can be a ruthenium carbene complex catalyst. The substrate may be, for example, a difunctional or trifunctional carboxylate ester containing norbornenyl end groups.

45 Claims, No Drawings

METATHESIS-CURABLE COMPOSITION

CROSS REFERENCE TO RELATED APPLICATIONS

This application is related to co-pending, commonly owned, U.S. patent application Ser. No. 10/430,592 entitled METATHESIS-CURABLE COMPOSITION WITH A REACTION CONTROL AGENT, U.S. patent application Ser. No. 10/430,953, now U.S. Pat. No. 6,844,408 issued Jan. 18, 2005, entitled COMPOSITION CURABLE BY METATHESIS REACTION, and U.S. patent application Ser. No. 10/430,590 entitled METHOD OF CURING A COMPOSITION BY METATHESIS REACTION USING REACTION CONTROL AGENT, each filed on May 6, 2003, and to U.S. Pat. No. 6,649,146 issued Nov. 18, 2003 and entitled DENTAL IMPRESSION MATERIAL UTILIZING RUTHENIUM METATHESIS CATALYST, which is a continuation-in-part of U.S. Pat. No. 6,455,029 issued Sep. 24, 2002 and entitled DENTAL IMPRESSION MATERIAL UTILIZING RUTHENIUM CATALYST, the disclosure of each of which are incorporated herein by reference in their entirety as if completely set forth herein below. This application is also related to co-pending, commonly-owned, U.S. patent application Ser. No. 10/313,359, now U.S. Pat. No. 6,861,386 issued Mar. 1, 2005, which claims the benefit of Provision U.S. Patent Application Ser. No. 60/338,439 filed Dec. 6, 2001, both entitled ACCELERATOR FOR METATHESIS CATALYST, the disclosures of which are incorporated herein by reference in their entirety as if completely set forth herein below.

FIELD OF THE INVENTION

This invention relates to compositions that undergo a metathesis reaction initiated by a metathesis catalyst and that contain a reaction control agent for controlling the progress of the metathesis reaction. More specifically, the control agent slows the progress of the metathesis reaction, and depending on the nature of the control agent, may prevent completion of the reaction until the composition is exposed to temperatures higher than the mixing temperature.

BACKGROUND OF THE INVENTION

Several types of thermoset polymers are generally used in commerce. One type is the acrylic thermoset polymers cured by a free radical addition mechanism. These polymers are cured by heat initiators, such as peroxides, or by photoinitiators, such as alpha diketones. A characteristic of the cured acrylates, however, is large polymerization shrinkage, which is undesirable for many uses. Another undesirable characteristic of acrylates is the formation of an oxygen-inhibited layer on the surface upon curing.

Another type of thermoset polymers is the one based on cationic polymerization of oxirane (epoxy) monomers. These are cured by use of a two-part system or by use of photoinitiators. The disadvantages of oxirane-derived polymers, however, are high water uptake in service, large polymerization shrinkage, and high cost.

Another type of thermoset polymers is the one based on a ring-opening metathesis polymerization (ROMP) mechanism. Metathesis is generally understood to mean the metal catalyzed redistribution of carbon-carbon double bonds. The polymerizable composition comprises a resin system that includes functionalities or groups that are curable by ROMP together with a metathesis catalyst, such as a ruthenium carbene complex. However, to efficiently utilize ROMP to prepare polymers, there is a need to control the progress of polymerization, particularly for molding applications, and especially in one-part systems.

In addition to ROMP, other metathesis reaction systems utilize metathesis catalysts, for example ring closing metathesis, acyclic diene metathesis polymerization, ring opening metathesis and cross metathesis. There is further a need for controlling the progress of reaction in these other metathesis reaction systems.

The thermoset monomer types that are curable by ROMP are the cycloolefins, such as dicyclopentadiene (DCPD), as described in Woodson U.S. Pat. No. 6,310,121. These resins are usually molded, and there is a further need to control the progress of the metathesis reaction for this monomer type.

There is also a need for thermoset polymers that can afford similar physical property profiles as the analogous acrylic, aziridine and oxirane systems, such as hydrophilicity, tailored modulus for the desired application, hardness, etc. with a minimum of their disadvantages, such as polymerization shrinkage.

Various patents address the polymerization of cyclic olefins such as DCPD, tricyclododecene and the like, for example, Tom U.S. Pat. No. 4,584,425. Two of these patents mention compounds containing norbornenyl functional groups and ROMP with the goal of producing a highly crosslinked polymer, namely Bissinger U.S. Pat. No. 6,075,068 and EP 1025830A2 by Moszner. Bissinger describes several ROMP catalyzed resin systems based on dinorbornenyl dicarboxylate ester (DNBDE) compounds or a combination of DNBDE compounds and acrylates. A trinorbornenyl tricarboxylate ester (TNBTE) compound was also disclosed. Moszner describes ROMP of norbornenyl monocarboxylate, which is a monofunctional monomer. However, the combination of the particular resins and catalysts does not achieve the controlled reaction progress desired for many applications.

SUMMARY OF THE INVENTION

The present invention provides a one-part composition that upon heating of its components undergoes a metathesis reaction, wherein the one-part composition contains components for controlling and catalyzing the metathesis reaction. The present invention further provides a two-part composition comprising a base paste and a catalyst paste that upon mixing the pastes undergoes a metathesis reaction, and a component for controlling the reaction is optional. The one-part and two-part compositions of the present invention each comprise at least 0.1 wt. % of a substrate containing at least two cycloolefin groups capable of undergoing a metathesis reaction. The substrate has the formula:

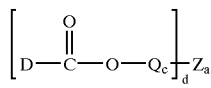

wherein:
- a=1–100, c=0 or 1 and d=2–4,
- when d=2 or 3, Z and Q are the same or different and are each a linear, branched, cyclic or polycyclic organic residue optionally containing siloxane groups (Si—O—Si) and optionally containing heteroatoms selected from the group consisting of B, N, O, Si, P, and S,
- when d=4, Z is C and Q is a linear, branched, cyclic or polycyclic organic residue optionally containing siloxane groups (Si—O—Si) and optionally containing heteroatoms selected from the group consisting of B, N, O, Si, P, and S, and
- D is a cycloolefinic residue and is different than Q or Z. By way of example, D may be a cycloolefinic residue selected from norbornenyl, norbornenylethyl, cyclopentenyl, 7-oxanorbornenyl, norbornadienyl, and/or 7-oxanorbornadienyl. In the two-part compositions of the present invention, the substrate is part of the base paste.

The one-part compositions of the present invention further comprise a ruthenium or osmium carbene complex catalyst that is capable of initiating a metathesis reaction, such as ring-opening metathesis polymerization (ROMP), and a reaction control agent for slowing the progress of the reaction, the catalyst and reaction control agent mixed with the olefinic substrate. In the two-part compositions of the present invention, the catalyst paste contains the catalyst, which upon mixing of the catalyst paste with the base paste, initiates the metathesis reaction of the olefinic substrate. For the two-paste compositions, a reaction control agent is optionally used as a component of the base paste. In either the one-part or two-part compositions, the catalyst may have the following structure:

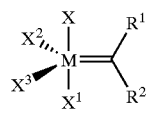

wherein:
- M is ruthenium or osmium,
- X is an alkylidene ligand with basicity higher than that of tricyclohexylphosphine ($PCy_3$),
- $X^1$ is either $PCy_3$ or a neutral electron donor ligand with basicity lower than that of $PCy_3$,
- $X^2$ and $X^3$ are either the same or different and are any anionic ligand, and
- $R^1$ and $R^2$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted.

In a two-part composition of the present invention, the catalyst may also have the following structure:

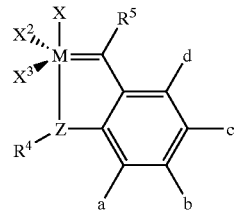

wherein:
- M is ruthenium or osmium,
- X is an alkylidene ligand with basicity higher than that of tricyclohexylphosphine ($PCy_3$),
- $X^2$ and $X^3$ are either the same or different and are any anionic ligand,
- Z is oxygen (O) or sulfur (S),
- $R^4$ is a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylamino, $C_1$–$C_{20}$ alkylsulfonyl and $C_1$–$C_{20}$ alkylsulfinyl, wherein each of the substituents is substituted or unsubstituted, and
- $R^5$, a, b, c, and d are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted.

The reaction control agent present in the one-part compositions and optionally in the two part compositions of the present invention slows the progress of the metathesis reaction. The control agent allows the composition to be cured after a certain delayed time after mixing (work time or pot life) or allows for completion of curing only by heating to temperatures above the mixing temperature. The reaction control agent is an organic compound that contains carbon-carbon double and/or triple bonds and one or more central Group 14 atoms, and can further contain, in the case of a Si central atom, oxygen atoms connected to the silicon to form siloxane bonds. More particularly, the reaction control agent has the following structure:

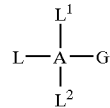

wherein:

G is selected from the group consisting of: $L^3$,

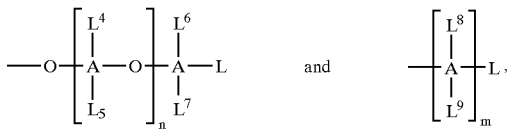 and 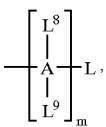,

L is a hydrocarbon fragment containing a double or triple bond, $L^1$–$L^9$ are each independently selected from the group consisting of L, alkyl, aryl, aralkyl or haloalkyl, A is a Group 14 atom, n=0–20, and m=0–20.

In an exemplary embodiment, the reaction control agent is tetraallyl silane (TAS):

TAS

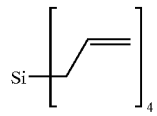

In a further exemplary embodiment, the reaction control agent prevents the metathesis reaction from proceeding to completion until an elevated temperature above the mixing temperature is applied to the one-part composition.

DETAILED DESCRIPTION

The present invention provides formulations of ruthenium or osmium carbene complexes together with a base resin that includes a substrate containing at least two cycloolefin groups curable by a metathesis reaction, either as a one-part system or a two-part (catalyst-base) system. The compositions of the present invention may also contain fillers and other additives, such as pigments or surfactants, for performance improvement. As used herein, the term "base" or "base component" refers to the chief component or active ingredient that undergoes the metathesis reaction, which in the present invention is the substrate containing at least two cycloolefin groups. A "base resin" is a resin that contains that chief component. The term "base paste" refers to the paste in a paste-paste (two-part) composition that contains the chief component, while the other paste, the catalyst paste, contains the catalyst that initiates the metathesis reaction of that chief component upon mixing of the two pastes.

When cured as a one-part system, the composition of the present invention additionally contains a reaction control agent that allows control of the progress of the metathesis reaction. In this embodiment, the metathesis catalyst and the reaction control agent are pre-dissolved in a suitable fluid, such as a phenylated silicone fluid, and mixed with the base component, which includes at least 0.1 wt. % of a resin having at least two cycloolefin groups, such as cycloalkenyl groups, per molecule. For example, the base resin may include a carboxylate ester backbone functionalized with at least two cycloolefin groups. In another example, the base resin may be a difunctional or trifunctional carboxylate ester containing norbornenyl end groups. The base component may further include monofunctional resins, such as a monofunctional carboxylate ester containing a norbornenyl end group. The compositions of this embodiment undergo a metathesis reaction initiated by the metathesis catalyst. The difunctional and polyfunctional resins, even in very small amounts, have a marked effect on the degree of crosslinking in the compositions of the present invention when activated by the particular metathesis catalysts disclosed herein. The reaction control agent, such as tetraallyl silane (TAS), controls the progress of the reaction to increase the working time of the composition and to control the viscosity build up. Depending on the nature of the control agent, completion of the reaction may be prevented until the composition is exposed to temperatures higher than the mixing temperature. Thus, the present invention provides formulations of ruthenium carbene complexes together with reaction control agents that allow control of the progress of a metathesis reaction on a substrate having at least two cycloolefin groups.

When cured as a two-part (base-catalyst) system, the composition of the present invention may optionally include a reaction control agent in the base paste. In this embodiment, the metathesis catalyst is pre-dissolved in a suitable fluid, such as a phenylated silicone fluid, to form a catalyst paste. The base paste contains a resin having at least two cycloolefin groups, such as cycloalkenyl groups, per molecule. For example, the base resin may include a carboxylate ester backbone functionalized with at least two cycloolefin groups. In another example, the base resin may be a bifunctional or trifunctional carboxylate ester containing norbornenyl end groups. The base paste also may optionally contain a reaction control agent to adjust the work/set time to a desirable level. Upon mixing the two pastes together, the composition of this embodiment undergoes a metathesis reaction initiated by the metathesis catalyst. In an exemplary embodiment, the metathesis reaction proceeds to completion at room temperature. In another exemplary embodiment, the metathesis reaction proceeds to near completion at room temperature, and a higher temperature is applied to complete the reaction, i.e., to more fully polymerize the mixture.

In both the one-part and two-part formulations of the present invention, the base resin contains a substrate (compound or mixture of compounds) having at least two cycloalkenyl groups that undergo a metathesis reaction, such as ROMP, when mixed with the ruthenium carbene complex. The two functional cycloalkenyl groups, for example, can be norbornenyl or norbornenylethyl groups. By way of further example, the groups may be cyclopentenyl, 7-oxanorbornenyl, norbornadienyl, and/or 7-oxanorbornadienyl.

In one embodiment of the present invention, the substrate has the formula:

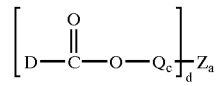

wherein:

a=1–100, c=0 or 1 and d=2–4, when d=2 or 3, Z and Q are the same or different and are each a linear, branched, cyclic or polycyclic organic residue optionally containing siloxane groups (Si—O—Si) and optionally containing heteroatoms selected from the group consisting of B, N, O, Si, P, and S, when d=4, Z is C and Q is a linear, branched, cyclic or polycyclic organic residue optionally containing siloxane groups (Si—O—Si) and optionally containing heteroatoms selected from the group consisting of B, N, O, Si, P, and S, and D is a cycloolefinic residue and is different than O or Z. By way of example, D may be a cycloolefinic residue selected from norbornenyl, norbornenylethyl, cyclopentenyl, 7-oxanorbornenyl, norbornadienyl, and/or 7-oxanorbornadienyl.

In one further embodiment, D is a norbornenyl group; a=1, c=0, and d=2; and Z is a linear, branched, cyclic or polycyclic organic residue with up to 20 heteroatoms selected from the group consisting of B, N, O, Si, P, and S. By way of example, Z may be a fragment selected from the group consisting of:

(1a)

where e=1—30

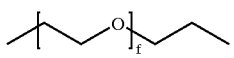
(1b)

where f=1–50

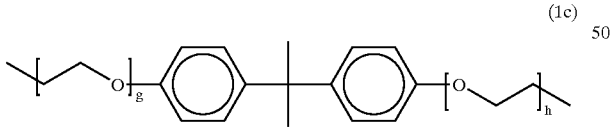
(1c)

where g>0, h>0, and g+h=2–30

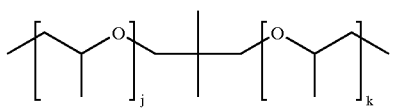
(1d)

where j>0, k>0, and j+k=2–30

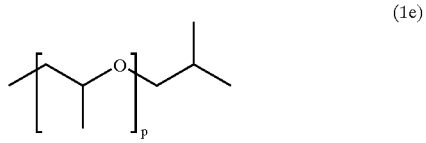
(1e)

where p=1–30

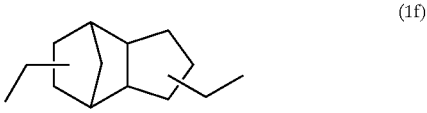
(1f)

For example, Z may be an alkyl group with e=6 (Compound 1a); an ethanediyloxy group with f=3 (Compound 1b1), f=4 (Compound 1b2) or f=8, (Compound 1b3); an ethoxylated Bisphenol A group with g+h=4 (Compound 1c); a neopentyl propanediyloxy group with j+k=2 (Compound 1d); a propanediyloxy group with p=3 (Compound 1e); or a tricyclododecane dimethane group (Compound 1f). Alternatively, Z may be a polyether fragment consisting optionally of one or more of butylene oxide units, ethylene oxide units or propylene oxide units. As a further example, Z may be a polyester diol consisting of units of a diacid, such as adipic acid, and alkylene oxide units, such as ethylene oxide, propylene oxide and butylene oxide.

These compounds can be prepared by the reaction of cyclopentadiene (CPD) with the corresponding acrylate as shown below. The corresponding acrylates are commercially available from suppliers such as Sartomer Company (Exton, Pa.).

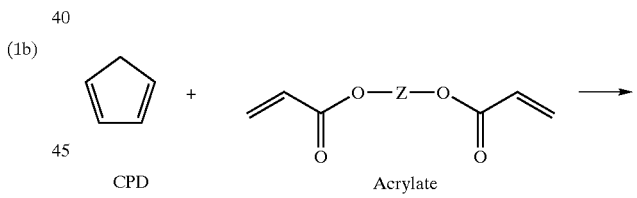
CPD          Acrylate

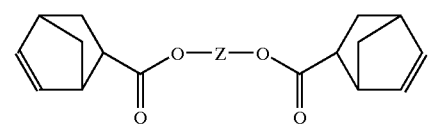
DNBDE

Alternatively, a DNBDE may be synthesized via an esterification reaction. As an example, CPD can be reacted with the adduct of hydroxyethyl acrylate with succinic anhydride to give a norbornenyl functional carboxylic acid A. This is followed by esterification of A with polyethylene glycol 400 (PEG 400) using p-toluenesulfonic acid as a catalyst in cyclohexane with azeotropic removal of water to produce Compound 1g as shown in the scheme below.

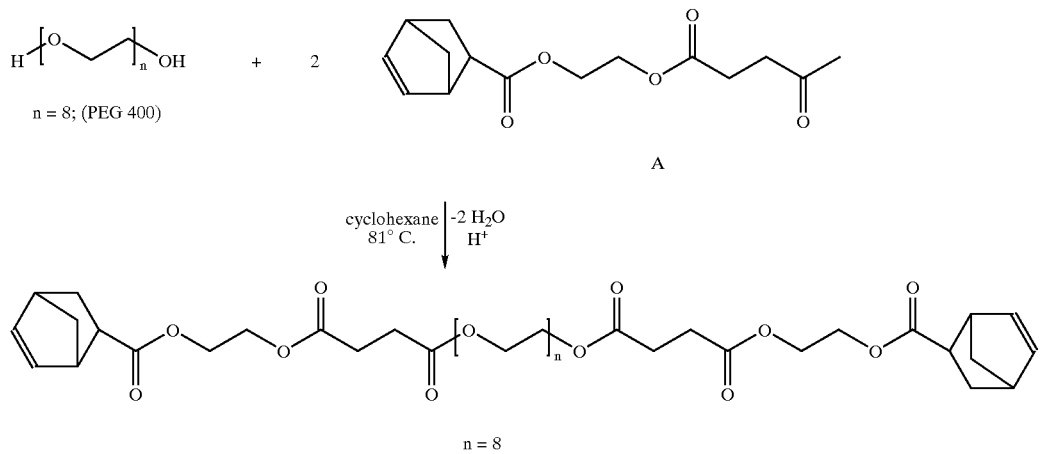

Other diols besides PEG 400 can be used, for example polyethylene glycol-polypropylene glycol copolymers such as Pluracol 1062 from BASF. Polyester diols can be used also, for example, ethylene butylene adipic acid polyester diol such as Desmophen 2000KS from Bayer, diethylene glycol adipic acid polyester diol, and the like. As yet another method, the DNBDE can be made via a transesterification reaction using 5-norbornene-2-carboxylic acid methyl ester and a tin catalyst, as an example; acid or base catalysts can also be used. When Z is a polyether fragment or a polyester fragment, the resultant polymer after ROMP can be soft and flexible, which makes it desirable for use as a dental impression material.

In another further embodiment, a trifunctional monomer can be used, referred to as Compound 2a, where D is a norbornenyl group; a and c are each 1, d=3, Z is $CH_3CH_2C$ and Q has the structure:

For a tetrafunctional monomer, d=4 and Z is C. For example, the base resin may be trinorbornenyl tricarboxylate ester or tetranorbornenyl tetracarboxylate ester.

The two-part compositions of the present invention contemplate a catalyst paste and base paste that upon mixture with one another, form a curable paste/paste system in which the metathesis reaction proceeds. Generally, in this system, the catalyst paste comprises the metathesis catalyst for initiating polymerization, and a solvent for the catalyst that is miscible or dispersible with the base paste and that does not interfere with the metathesis reaction. In the one-part systems, the catalyst is first dissolved in this solvent and then combined with the base component optionally containing the reaction control agent. The solvent may be a siloxane substituted with alkyl groups and arylalkyl or aryl groups. The presence of the aryl or aralkyl groups assist the solubility of the metal carbene complex catalyst while having a relative reduced polarity as compared to a carboxylic ester, such as diethyl phthalate for example. This siloxane can be, for example, 3-phenyl-heptamethyl-trisiloxane. This siloxane can also be a phenyl trimethicone, such as Dow Corning fluid 556 or Silcare 15M30 from Clariant (Sulzbach, Germany). Alternatively, an alkylmethylsiloxane-arylalkylmethylsiloxane copolymer can be used, such as 45–55% hexylmethylsiloxane—(45–55% 2-phenylpropylmethylsiloxane) copolymer. Mixtures of the above, especially for achieving a desired viscosity, can also be employed. The base paste generally comprises the substrate that is curable via ROMP or other metathesis reaction and optionally a reaction control agent to control the working time. The composition may further include filler systems and/or optional additives suitable for the particular application, such as pigments or surfactants, which do not interfere with the reaction.

The catalysts useful in the present invention include ruthenium or osmium carbene complexes that are derivatives of the parent benzylidene ruthenium complex 1, known as the Grubbs catalyst, which has the following structure:

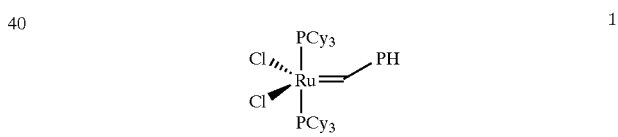

wherein Ph is phenyl, and Cy is cyclohexyl. The ring-opening metathesis activity, working time and/or air stability of the parent complex 1 can be increased by making substitutions to the parent complex 1. Thus, the catalyst used in the present invention may have the following general structure:

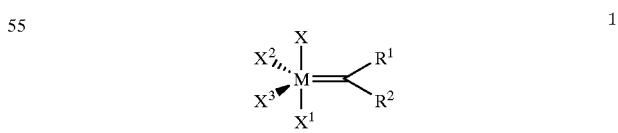

wherein:
M is ruthenium or osmium,
X is an alkylidene ligand with basicity higher than that of tricyclohexylphosphine (PCy$_3$),
X$^1$ is either PCy$_3$ or a neutral electron donor ligand with basicity lower than that of PCy$_3$, $X^2$ and $X^3$ are either the same or different and are any anionic ligand, and $R^1$ and $R^2$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted.

In one category of derivative complexes of the above general structure, referred to generally as complex 2 catalysts, and which are useful as catalysts in the one or two-part compositions of the present invention, X is an alkylidene ligand with basicity higher than that of tricyclohexylphosphine ($PCy_3$) and $X^1$ is $PCy_3$. In one embodiment, for example, a derivative ruthenium complex 2-1 of complex 1 is formed by substituting an alkylidene ligand X, such as a saturated imidazolidine ligand, for one of the tricyclohexylphosphine ($PCy_3$) ligands, in accordance with the following formula:

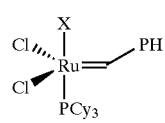

2-1

The ligands X may be 4,5-dihydroimidazol-2-ylidenes, which have the following general structure:

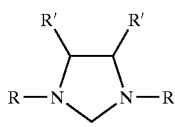

These substituted alkylidene ligands X have a basicity or proton affinity higher than that of tricyclohexylphosphine, which is believed to contribute to the higher activity and higher air stability.

A derivative ruthenium complex 2-2 of complex 1 containing the alkylidene 1,3-bis(2,4,6-trimethylphenyl)-imidazol-2-ylidene (sIMES) ligand is shown here:

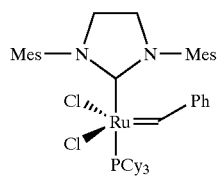

2-2 wherein Mes is mesityl (2,4,6 trimethylphenyl). It may be appreciated that the ligand X in structure 2-2, may also be shown with an arc between the N atoms in the imidazolidene group to indicate that a double bond is present therebetween. For example, an alternative equivalent structure for Complex 2-2 is:

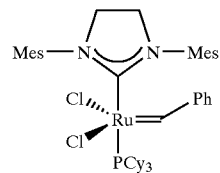

The ligand has been shown both ways in the art of metathesis catalysts, such that the two structures should be considered equivalent and both structures should be understood to represent a double bond between the N atoms in the imidazolidene group. These derivatives of complex 1 are particularly useful in the two-part compositions of the present invention.

In another category of derivative complexes of the general structure, referred to generally as complex 4 catalysts, and which are useful as catalysts in the one or two-part compositions of the present invention, X is an alkylidene ligand with basicity higher than that of tricyclohexylphosphine ($PCy_3$) and $X^1$ is a neutral electron donor ligand with basicity lower than that of $PCy_3$. To achieve a longer working time (pot life) and improve compatibility with the reaction control agents used in the one-part compositions of the present invention, as described further below, the derivative complexes 2 are thus further modified for use in the one-part compositions by substituting the other tricyclohexylphosphine ($PCy_3$) with a neutral electron donor ligand $X^1$ with a lower basicity (as expressed by the pKa) or proton affinity than $PCy_3$. For example, Complex 2-1 is modified to form Complex 4-1 as shown below:

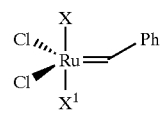

4-1

Examples of compound types that can be used as neutral electron donor ligands are: phosphines, phosphites, phosphinites or phosphonites. In an exemplary embodiment, $X^1$ is a phosphine of the formula $PR^3R^4R^5$ where $R^3$, $R^4$, and $R^5$ are alkyl, aralkyl or aryl, with basicity lower than that of $PCy_3$. In a further exemplary embodiment, $R^3$, $R^4$, and $R^5$ are each n-butyl, such that $X^1$ is tri-n-butylphosphine ($PBu_3$), and X is sIMES as shown below as structure 4-2:

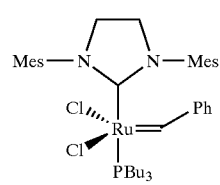

4-2

In another category of derivative complexes of the general structure, referred to generally as complex 3 catalysts, and which are particularly useful in the two-part compositions of the present invention, X is an alkylidene ligand with basicity higher than that of tricyclohexylphosphine ($PCy_3$) and $X^1$, $R^1$ and $R^2$ are substituted, as shown in the following general structure:

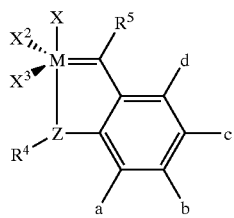

wherein:

M is ruthenium or osmium,

X is an alkylidene ligand with basicity higher than that of tricyclohexylphosphine ($PCy_3$), Z is oxygen (O) or sulfur (S)

$X^2$ and $X^3$ are either the same or different and are any anionic ligand, $R^4$ is a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylamino, $C_1$–$C_{20}$ alkylsulfonyl and $C_1$–$C_{20}$ alkylsulfinyl, wherein each of the substituents is substituted or unsubstituted, and $R^5$, a, b, c, and d are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted.

In an exemplary embodiment of a complex 3 catalyst, M is ruthenium, X is an alkylidene ligand with basicity higher than that of tricyclohexylphosphine ($PCy_3$), $X^2$ and $X^3$ are halogen atoms, Z is oxygen, $R^4$ is a $C_1$ to $C_{10}$ alkyl fragment, a, b, c and d are either hydrogen or a $C_1$ to $C_{10}$ alkyl or a $C_1$ to $C_{10}$ alkoxy group, and $R^5$ is hydrogen.

In another exemplary embodiment of a complex 3 catalyst, M is ruthenium, X is 1,3-bis(2,4,6-trimethylphenyl)-imidazol-2-ylidene (sIMES), $X^2$ and $X^3$ are chlorine atoms, Z is oxygen, $R^4$ is 2-propyl, a, b, c and d are either hydrogen or methoxy, and $R^5$ is hydrogen. Complex 3-1 is an example of this type of exemplary catalyst for a two-part composition of the present invention. Complex 3-1 is 1,3-bis-(2,4,6-trimethylphenyl)-2-(imidazolidinylidene) dichloro(o-isopropoxyphenylmethylene)ruthenium having the following structure:

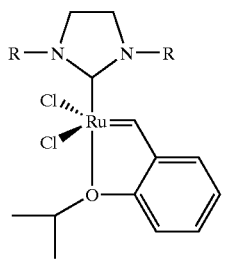

wherein R is mesityl. Again, the structure may also be shown with an arc between the N atoms in the imidazolidene group to indicate that a double bond is present therebetween, as discussed above. The combination of an olefinic resin system and complex 3-1 is believed to provide a highly efficient metathesis reaction system. Other examples for this category of catalysts, as well as the synthesis of these catalysts, are fully described in U.S. Pat. No. 6,921,735 issued Jul. 25, 2005 and entitled RECYCLABLE METATHESIS CATALYSTS, and incorporated by reference herein in its entirety.

The one-part compositions of the present invention further comprise a reaction control agent. After mixing of the composition components, the control agent slows the metathesis reaction, and thereby allows for an increase in the time period before cure, or before the metathesis reaction proceeds to completion or to a desired extent short of completion. The length of this time period, also called work time or pot life, may be further controlled by preventing completion of the reaction until the composition is heated to a temperature higher than the mixing temperature, for example, at least 30° C. above the mixing temperature. By way of example, the composition components may be mixed at ambient temperature, followed by heat curing at 60° C. or greater, such as 100° C. or 150° C., or the composition components may be mixed at sub-ambient temperatures (at least 30° C. below ambient), followed by raising the temperature to ambient to complete the reaction. The reaction control agent also allows for control of the viscosity build up as the metathesis reaction proceeds, which is useful for many molding applications.

The reaction control agent is an organic compound that contains carbon-carbon double and/or triple bonds and one or more central Group 14 atoms, and can further contain, in the case of silicon as the central atom(s), oxygen atoms connected to silicon to form siloxane bonds. The reaction control agent has the structure shown below:

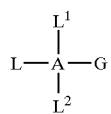

wherein:

G is selected from the group consisting of: $L^3$,

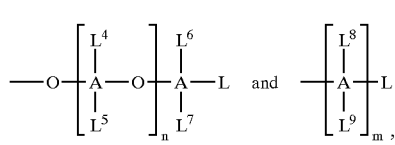

L is a hydrocarbon fragment containing a double or triple bond;

$L^1$–$L^9$ are each independently selected from the group consisting of L, alkyl, aryl, aralkyl or haloalkyl;

A is a Group 14 atom;

n=0–20; and m=0–20.

Of the Group 14 atoms, which include C, Si, Ge, Sn and Pb, the central atom is advantageously Si, Ge or Sn, and more advantageously Si.

In one embodiment of the present invention, G=$L_3$ such that the reaction control agent is a tetracoordinated compound having at least one substituent group L that is a hydrocarbon fragment containing a double or triple bond. Allyl and vinyl groups are hydrocarbon fragments containing a double bond, for example, and alkynyl groups, such as propargyl and ethynyl groups, are hydrocarbon fragments containing a triple bonds, for example. For the other substituent groups $L^1$, $L^2$, $L^3$, if not a hydrocarbon fragment containing a double or triple bond, then the substituent group is an alkyl, aryl, aralkyl or haloalkyl group, which are essentially inert to the metathesis reaction. Thus, it is the hydrocarbon fragment containing the double or triple bond that determines the extent of the retardation of the metathesis reaction, such that a greater number of such hydrocarbon fragments would be expected to achieve longer working times than similar structures containing fewer of such hydrocarbon fragments. An exemplary inert substituent is the methyl group.

In the embodiment of the present invention where G is defined as:

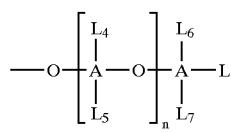

the central atom A is Si, such that the reaction control agent contains a straight chain siloxane compound in which the ends of the chain are capped by hydrocarbon fragments containing a double or triple bond. The substituent groups within the chain (i.e., $L^1$, $L^2$, $L^4$, $L^5$, $L^6$, $L^7$) may also be hydrocarbon fragments containing double or triple bonds or may be an inert substituent including alkyl, aryl, aralkyl or haloalkyl groups. By way of example, where A is silicon and n=0, a disiloxane compound is formed, such as divinyltetramethyldisiloxane.

In the embodiment of the present invention where G is:

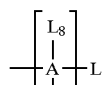

a structure is formed having a chain of single-bonded Group 14 atoms where the ends of the chain are capped by hydrocarbon fragments containing a double or triple bond. As with the previous embodiment, the substituent groups within the chain (i.e., $L^1$, $L^2$, $L^8$, $L^9$) may be either the hydrocarbon fragment with the double or triple bond or may be an inert alkyl, aryl, aralkyl or haloalkyl group. Where m=2, for example, a 3 atom chain is formed with 2 hydrocarbon fragment double or triple bond end groups and 6 $L^1$–$L^9$ substituent groups.

The reaction control agent is incorporated into the paste to slow the ROMP mechanism upon mixing of the components, thereby increasing the working time of the resin before cure, and even to prevent completion of the ROMP mechanism in the absence of an elevated temperature above the mixing temperature. While numerous retarders are known for use with the platinum catalysts in the hydrosilation mechanism, unexpectedly, some of the most common of them are not effective with the ruthenium carbene catalysts in the ROMP mechanism. However, tetraallyl silane (TAS), for example, has been found to provide significantly increased working time, particularly with catalyst 4-2. Similarly, other compounds having a Group 14 central atom and one or more ligands having a hydrocarbon fragment and carbon-carbon double or triple bond have also been found to be effective, as explained further, below.

EXAMPLES

The following dinorbornenyl dicarboxylate ester (DN-BDE) compounds 1a–1f were synthesized using the Diels Alder reaction of cyclopentadiene (CPD) with commercially available acrylates, as described above, with Z for the DNBDE materials being selected from:

Compound 1a:

where e=6

Compound 1b1:

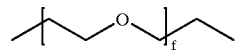

where f=4

Compound 1b2:

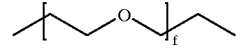

where f=8

Compound 1b3:

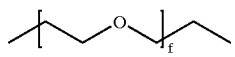

where f=3

Compound 1c:

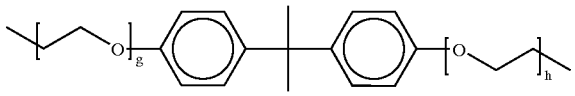

where g>0, h>0, and g+h=4

Compound 1d:

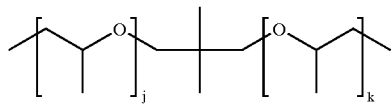

where j>0, k>0, and j+k=2

Compound 1e:

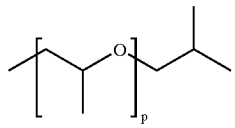

where p=3

Compound 1f:

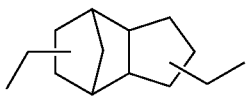

A trinorbornenyl tricarboxylate ester (TNBTE) compound 2a with the structure below was also synthesized using the reaction of CPD with the corresponding acrylate:

Compound 2a

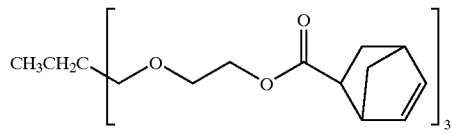

The following Examples were conducted to evaluate one-part compositions requiring the application of heat to complete the metathesis reaction. First, the catalyst, Complex 4-2 described above and obtained from Materia, Inc., Pasadena, Calif., was dissolved in a partially phenyl substituted polymethylsiloxane, in particular, Dow Corning fluid 556, and mixed with fillers to provide a catalyst paste, as provided below in Table 1:

TABLE 1

| Catalyst Paste Composition (wt. %) - One-part Formulation | |
|---|---|
| Dow Corning Fluid 556 | 36.2 |
| Calcium Silicate Wollastonite (2–10μ) | 53.3 |
| Sub-micron Silica | 10 |
| Catalyst 4-2 | 0.5 |
| Total | 100 |

Dissolving the catalyst in the solvent may be facilitated by first forming a solution of 5–10% of the catalyst in methylene chloride, then mixing the solution with the solvent, and then evaporating the methylene chloride. Next, one of the above-synthesized resin compounds 1a–1f or 2a and a reaction control agent dilution mixture (10 mg/g tetraallyl silane, TAS) were mixed with the catalyst paste at ambient temperature to form an activated resin. The resin basis concentration of TAS used was 1000 ppm and of catalyst used was 160 ppm. Some of the activated resins were tested as neat compositions, i.e., without filler loading, while other activated resins were then mixed with fillers to prepare pastes with low or high loading. The completed compositions are provided in Table 2:

TABLE 2

| One-Part Composition (wt. %) for Heat Cure | | | |
|---|---|---|---|
| | Without Fillers | Low Loading | High Loading |
| DNBDE or TNBTE | 95.800 | 68.020 | 53.935 |
| Catalyst Paste (0.5 wt. % Complex 4-2) | 3.200 | 2.270 | 1.802 |
| TAS Reaction Control Agent (10 mg/ml concentrate) | 1.000 | 0.710 | 0.563 |
| Hydrophobic Fumed Silica | 0.000 | 20.000 | 35.400 |
| Crystalline silica | 0.000 | 9.000 | 8.300 |
| Total | 100.000 | 100.000 | 100.000 |

These mixed activated resins with or without fillers were subsequently cured at 140° C. with nitrogen pressure in a Belleglass HP unit.

After curing, the shrinkage using a pycnometer and the Shore D hardness of the composites were measured, and the results were compared with the same measurements made for an aromatic methacrylate formula based resin and an aliphatic acrylate based formula with the compositions shown in Table 3 below.

TABLE 3

| Comparative Prior Art Compositions | | |
|---|---|---|
| | Aliphatic Resin | Aromatic Resin |
| Tricyclodecane dimethanol diacrylate (SR-833S, Sartomer) | 78.78 | 0 |

TABLE 3-continued

Comparative Prior Art Compositions

| | Aliphatic Resin | Aromatic Resin |
|---|---|---|
| Triethylene glycol diacrylate (SR-272, Sartomer) | 19.70 | 0 |
| EBDMA[1]-6, (SR-541, Sartomer) | 0 | 59.09 |
| EBDMA[1]-2.5 (X-9070, Esstech) | 0 | 24.62 |
| BisGMA[2] (Cook) | 0 | 9.85 |
| Triethylene glycol dimethacrylate | 0 | 4.92 |
| Benzoyl Peroxide | 0.98 | 0.98 |
| UV-9 | 0.49 | 0.49 |
| Butylated hydroxytoluene | 0.05 | 0.05 |
| Total | 100.00 | 100.00 |

[1]Ethoxylated bisphenol A dimethacrylate
[2]Bisphenol A diglycidyl ether dimethacrylate The comparisons of the above formulations neat (unloaded) and also filled with crystalline silica and hydrophobic fumed silica at two different levels (low and high loading) are shown below in Tables 4, 5 and 6. Table 4 provides results for the Neat Resin compositions:

TABLE 4

Neat Resin Compositions

| Monomer Type | Shore D Hardness, 140° C. Cure | Volumetric Shrinkage (%) |
|---|---|---|
| Aliphatic Acrylate Resin | 87 | 9.2, 9.2 |
| Aromatic Methacrylate Resin | 83 | 6.8, 6.7, 6.7 |
| Cmpd 1b1 | 77 | 3.9, 3.6, 3.7 |

Table 5 provides results for the compositions with low loading:

TABLE 5

Compositions with Low Filler Loading

| Monomer Type | Shore D Hardness, 140° C. Cure | Volumetric Shrinkage (%) |
|---|---|---|
| Aliphatic Acrylate Resin | 85 | 7.2, 8.6 |
| Aromatic Methacrylate Resin | 79 | 5.2, 5.7, 5.2 |
| Cmpd 1b1 | 78 | 0.4, 0.5 |
| Cmpd 1a | 79 | 2.1 |
| 55 wt. % Cmpd 1c/45 wt. % Cmpd 2a | 74 | 2.2 |
| Cmpd 2a | 68 | |
| 80 wt. % Cmpd 1f/20 wt. % Cmpd 1b3 | 77 | 0.1, 0.4 |
| Cmpd 1b3 | | 1.2, 0.8 |
| Cmpd 1e | 72 | 1.7 |

Table 6 provides results for the compositions with high loading:

TABLE 6

Compositions with High Filler Loading

| Monomer Type | Shore D Hardness, 140° C. Cure | Volumetric Shrinkage (%) | Flexural Strength/ Modulus (MPa) | Diametral Strength (MPa) |
|---|---|---|---|---|
| Aliphatic Acrylate Resin | Brittle | 5.3, 5.5 | Brittle | 13 (4) |
| Aromatic Methacrylate Resin | 90 | 4.4 | 98 (0.4)/4197 | 50 (10) (43) |
| Cmpd 1b1 | 85 | 1.5 | 28 (1)/442 (62) | 49 (5) |
| 55 wt. % Cmpd 1c/45 wt. % Cmpd 2a | 85 | 0.8, 0.8 | | |
| 55 wt. % Cmpd 1b1 | 83 | 1.3, 1.3 | 62 (0.2)/2200 (45) | |
| 55 wt. % Cmpd 1c/45 wt. % Cmpd 1d | 80 | 0.6 | | |
| Cmpd 1e | 87 | 1 | 37 (9)/1284 (236) | |
| Cmpd 1b2 | 63 | 1.1 | bends | |
| Cmpd 1b3 | 72 | 0.9 | bends | |
| Cmpd 1d | 72 | 1.0, 0.9 | | |
| 80 wt. % Cmpd 1f/20 wt. % Cmpd 1b3 | 90 | 0.6, 0.5 | 95 (5)/4587 (264) | 38 (12) |
| 80 wt. % Cmpd 1f/20 wt. % Cmpd 1e | 87 | 1.1, 0.8 | 88 (6)/4077 (267) | |

The results above show some reduction in the hardness of the cured neat composition of the present invention compared to the neat prior art aliphatic and aromatic resins, but with a dramatic improvement in the shrinkage of the composites during cure. For the low filler loading composites of the present invention compared to the low filler loading prior art composites, a low disparity in hardness can be seen with most of the composites of the present invention, while an even more dramatic reduction in shrinkage is observed. For the highly filler loaded composites of the present invention compared to the highly loaded prior art composites, a low disparity in hardness can also be seen with most of the composites of the present invention, and a dramatic reduction in shrinkage is observed. In general the cycloaliphatic resin 1f exhibits the highest hardness.

In addition to the DC-556 diluent, another catalyst diluent was tested in the highly loaded composition to determine if there is a difference in the reactivity of the catalyst with a diluent that contains an ester functionality. The results are summarized in Table 7.

TABLE 7

| Catalyst Diluent | Monomer Type | Shore D Hardness, 140° C. Cure | Flexural Strength/ Modulus (MPa) |
|---|---|---|---|
| DC-556 | 55 wt. % Cmpd 1c/45 wt. % Cmpd 1b1 | 83 | 62 (0.2)/2200 (45) |
| Dibutyl Phthalate | 55 wt. % Cmpd 1c/45 wt. % Cmpd 1b1 | 85 | <20/bends |
| DC-556 | Cmpd 1b3 | 72 | <20/bends |
| Dibutyl Phthalate | Cmpd 1b3 | 34 | <20/bends |

The diluent DC-556, which does not contain an ester functionality, was superior to the dibutyl phthalate diluent with two different substrate resins, most likely due to its low polarity. This is shown by the higher bending strength indicating improved crosslinking.

The following Examples were conducted to evaluate two-part compositions that undergo room temperature curing upon mixing of the catalyst and base paste. The composites were tested with filler loading. The synthesized resins described above in neat form constituted the base pastes. The catalyst paste contained a mixture of the following components:

TABLE 8

Catalyst Paste Composition (wt. %) - Two-part Formulation (Loaded)

| | |
|---|---|
| Dow Corning Fluid 556 | 36.6 |
| Calcium Silicate Wollastonite (2–10μ) | 53.3 |
| Sub-micron Silica | 10.0 |
| Catalyst 2-2 or 3-1 | 0.1 |
| Total | 100 |

The neat norbornenyl carboxylate resin paste was mixed with the catalyst paste at a 1:0.42 base:catalyst paste weight ratio at room temperature, and the results of the room-temperature cured composites are provided in Table 9.

TABLE 9

| Resin E | Work Time/Set Time (sec) | | Shore D Hardness (24 hours) | |
|---|---|---|---|---|
| Number | Catalyst 2-2 | Catalyst 3-1 | Catalyst 2-2 | Catalyst 3-1 |
| Cmpd 1a | 225/>600 | 16/30 | 57 (2) | 50 (5) |
| Cmpd 1b1 | 108/>600 | 15/28 | 34 (1) | 55 (4) |
| Cmpd 1b2 | 140/320 | 20/40 | 30 (1) | 25 (3) |
| Cmpd 1b3 | >300 | 20/40 | soft | 55 (5) |
| Cmpd 1c | >300 min | 55/135 | Gel only | 53 (2) |
| Cmpd 1d | 360 | 22/40 | 15 (1) | 58 (1) |
| Cmpd 1e | 195/600 | 15/25 | 30 (1) | Not Measured |
| Cmpd 1f | >300 | 75/180 | Gel only | 60 (3) |
| Cmpd 2a | >300 min | 36/70 | 34 (1) | 43 (3) |

The compositions cured best with the catalyst complex 3-1, through the complex 2-2 may be used for applications where longer work and set times are desired. Additional heat may be applied to accelerate or complete curing after the composition has been worked into the desired shape and environment.

There are many potential uses for compositions of the present invention. By way of example and not limitation, dental applications may include: dental prostheses, tooth filling materials, crown and bridge materials, dental impression materials and orthodontic appliances. By way of example and not limitation, these materials can be used as adhesives or protective coatings for automotive, aerospace, architectural, and electric/electronic applications. The one-part compositions of the present invention may be particularly suitable for dental prostheses, orthodontic appliances such as orthodontic brackets that are optionally fiber reinforced, optical lenses, and electronic device packaging. The two-part compositions of the present invention may be particularly suitable for cements used in orthopedic surgery, such as for bone cementation and verterbroplasty procedures. All of the foregoing are intended to be exemplary uses for the compositions of the present invention and are not intended to limit the invention in any way.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention is therefore not limited to the specific details, representative apparatus and method and illustrative examples shown and described. Accordingly, departures may be made from such details without departing from the scope of the general inventive concept.

What is claimed is:

1. A composition comprising at least 0.1 wt. % of a substrate containing at least two cycloolefin groups capable of undergoing a metathesis reaction and a metal carbene complex catalyst capable of initiating the metathesis reaction, wherein the substrate has the formula:

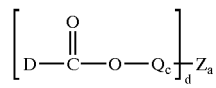

wherein:

a=1–100, c=0 or 1 and d=2–4, when d=2 or 3, Z and Q are the same or different and are each a linear, branched, cyclic or polycyclic organic residue optionally containing siloxane groups (Si—O—Si) and optionally containing heteroatoms selected from the group consisting of B, N, O, Si, P, and S, when d=4, Z is C and Q is a linear, branched, cyclic or polycyclic organic residue optionally containing siloxane groups (Si—O—Si) and optionally containing heteroatoms selected from the group consisting of B, N, O, Si, P, and S, and D is a cycloolefinic residue and is different than Q or Z; and wherein the catalyst has a structure selected from:

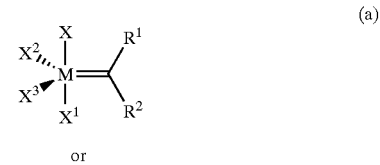

or

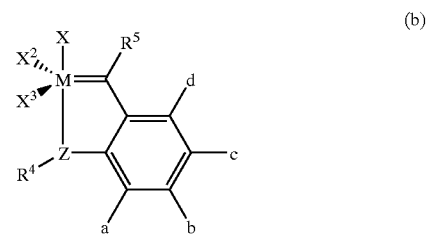

wherein:

M is ruthenium or osmium,

X is an alkylidene ligand with basicity higher than that of tricyclohexylphosphine (PCy$_3$), X$^1$ is either PCy$_3$ or a neutral electron donor ligand with basicity lower than that of PCy$_3$, $X^2$ and $X^3$ are either the same or different and are any anionic ligand, Z is oxygen (O) or sulfur (S), $R^1$ and $R^2$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted $R^4$ is a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylamino, $C_1$–$C_{20}$ alkylsulfonyl and $C_1$–$C_{20}$ alkylsulfinyl, wherein each of the substituents is substituted or unsubstituted, and $R^5$, a, b, c, and d are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted.

2. The composition of claim 1 wherein the substrate comprises a dinorbornenyl dicarboxylate ester.

3. The composition of claim 1 wherein D is a norbornenyl group; a=1, c=0, and d=2; and Z is a fragment selected from the group consisting of:

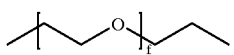  (1a)

where e=1–30

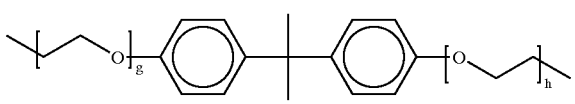  (1b)

where f=1–50

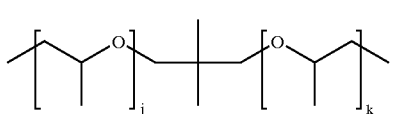  (1c)

where g>0, h>0, and g+h=2–30

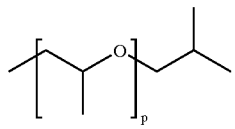  (1d)

where j>0, k>0, and j+k=2–30

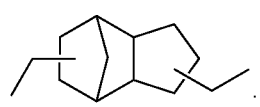  (1e)

where p=1–30 and

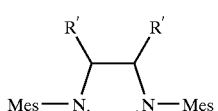  (1f)

4. The composition of claim 1 wherein Z is a polyether fragment.

5. The composition of claim 4 wherein the polyether fragment comprises one or more of butylene oxide units, ethylene oxide units or propylene oxide units.

6. The composition of claim 1 wherein Z is a polyester diol consisting of diacid units and alkylene oxide units.

7. The composition of claim 1 wherein Z is a polyester diol consisting of units of adipic acid and units of an alkylene oxide selected from the group consisting of ethylene oxide, propylene oxide and butylene oxide.

8. The composition of claim 1 wherein D is a cycloolefinic residue selected from the group consisting of norbornenyl, norbornenylethyl, cyclopentenyl, 7-oxanorbornenyl, norbornadienyl, and 7-oxanorbornadienyl.

9. The composition of claim 1 wherein the catalyst has structure (a) and wherein $X^1$ is a phosphine, phosphite, phosphinite or phosphonite.

10. The composition of claim 9 wherein $X^1$ is a phosphine of the formula $PR^3R^4R^5$ wherein $R^3$, $R^4$, and $R^5$ are each an alkyl, aralkyl or aryl.

11. The composition of claim 10 wherein $X^1$ is a phosphine of the formula $PR^3R^4R^5$ wherein $R^3$, $R^4$, and $R^5$ are each n-butyl.

12. The composition of claim 1 wherein the catalyst has structure (a) and wherein $R^1$ is phenyl and $R^2$ is hydrogen.

13. The composition of claim 1 wherein X has the structure:

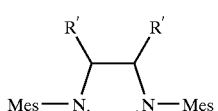

wherein Mes is mesityl and R' is hydrogen or phenyl.

14. The composition of claim 1 wherein the catalyst has the structure:

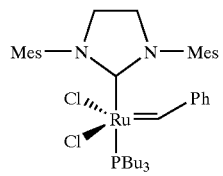

wherein Bu is butyl, Ph is phenyl and Mes is mesityl.

15. The composition of claim 1 further comprising a reaction control agent for slowing the progress of the metathesis reaction after mixing the substrate and the catalyst at a mixing temperature and having the structure:

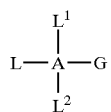

wherein:
G is selected from the group consisting of: $L^3$,

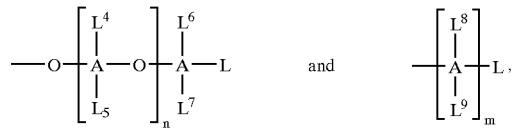

L is a hydrocarbon fragment containing a double or triple bond,
$L^1$–$L^9$ are each independently selected from the group consisting of L, alkyl, aryl, aralkyl or haloalkyl,
A is a Group 14 atom, and
each of n and m=0–20.

16. The composition of claim 15 wherein L is a hydrocarbon fragment containing an allyl group, a vinyl group, an ethynyl group or a propargyl group.

17. The composition of claim 16 wherein the reaction control agent includes at least two L groups.

18. The composition of claim 16 wherein the reaction control agent includes at least three L groups.

19. The composition of claim 15 wherein A is silicon.

20. The composition of claim 15 wherein the reaction control agent is tetraallyl silane.

21. The composition of claim 15 wherein the reaction control agent is capable of preventing completion of the metathesis reaction in the absence of an applied temperature greater than the mixing temperature.

22. The composition of claim 1 comprising a base paste and a catalyst paste, wherein the base paste comprises the substrate, wherein the catalyst paste comprises the metal carbene complex catalyst dissolved in a solvent that is miscible with the base paste, and wherein the catalyst is capable of initiating the metathesis reaction upon mixing the base paste with the catalyst paste at room temperature.

23. The composition of claim 22 wherein the solvent is a siloxane substituted with alkyl groups and with arylalkyl or aryl groups.

24. The composition of claim 23 wherein the solvent is a phenyl trimethicone.

25. The composition of claim 1 further comprising a solvent in which the metal carbene complex catalyst is dissolved, wherein the solvent is a siloxane substituted with alkyl groups and with arylalkyl or aryl groups.

26. The composition of claim 25 wherein the solvent is a phenyl trimethicone.

27. A composition capable of undergoing a metathesis reaction upon mixing of its components, the components comprising:
a resin having a carboxylate ester backbone functionalized with at least two cycloolefin groups capable of undergoing a metathesis reaction;
a ruthenium carbene complex catalyst capable of initiating the metathesis reaction in the composition, wherein the catalyst has the formula:

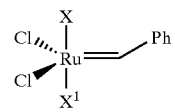

wherein Ph is phenyl, X is an alkylidene ligand having a basicity higher than that of tricyclohexylphosphine (PCy$_3$), and $X^1$ is a phosphine, phosphite, phosphinite or phosphonite having a basicity lower than that of PCy$_3$; and
a reaction control agent for preventing completion of the metathesis reaction after mixing the composition components at a mixing temperature and until exposing the composition to an elevated temperature above the mixing temperature, the reaction control agent having the structure:

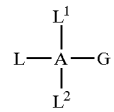

wherein:
G is selected from the group consisting of: $L^3$,

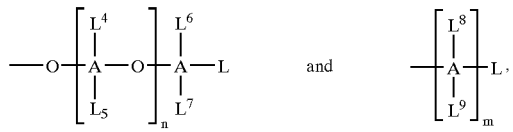

L is a hydrocarbon fragment containing an allyl group, a vinyl group, an ethynyl group or a propargyl group,
$L^1$–$L^9$ are each independently selected from the group consisting of L, alkyl, aryl, aralkyl or haloalkyl,
A is a Group 14 atom,
n=0–20, and
m=0–20.

28. The composition of claim 27 wherein the cycloolefin groups are selected from the group consisting of norbornenyl, norbornenylethyl, cyclopentenyl, 7-oxanorbornenyl, norbornadienyl, and 7-oxanorbornadienyl.

29. The composition of claim 27 wherein $X^1$ is a phosphine of the formula PR$^3$R$^4$R$^5$ wherein R$^3$, R$^4$, and R$^5$ are each an alkyl, aralkyl or aryl.

30. The composition of claim 29 wherein $X^1$ is a phosphine of the formula PR$^3$R$^4$R$^5$ wherein R$^3$, R$^4$, and R$^5$ are n-butyl.

31. The composition of claim 27 wherein the X has the structure:

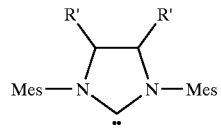

wherein Mes is mesityl and R' is hydrogen or phenyl.

32. The composition of claim 27 wherein the catalyst has the structure:

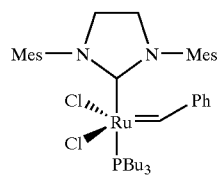

wherein Bu is butyl, Ph is phenyl and Mes is mesityl.

33. The composition of claim 27 wherein the reaction control agent includes at least two L groups.

34. The composition of claim 27 wherein the reaction control agent includes at least three L groups.

35. The composition of claim 27 wherein A is silicon.

36. The composition of claim 27 wherein the reaction control agent is tetraallyl silane.

37. The composition of claim 27 wherein the resin comprises a dinorbornenyl dicarboxylate ester.

38. The composition of claim 27 further comprising a solvent in which the metal carbene complex catalyst is dissolved, wherein the solvent is a siloxane substituted with alkyl groups and with arylalkyl or aryl groups.

39. The composition of claim 38 wherein the solvent is a phenyl trimethicone.

40. A two-paste composition capable of undergoing a metathesis reaction at room temperature upon mixing the two pastes together, the composition comprising:
(a) a base paste comprising a base resin having a carboxylate ester backbone functionalized with at least two cycloolefin groups capable of undergoing a metathesis reaction;
(b) a catalyst paste comprising a metal carbene complex catalyst dissolved in a catalyst solvent that is miscible with the base paste and capable of initiating the metathesis reaction in the composition, wherein the catalyst has the structure:

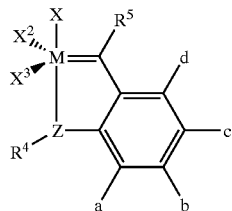

wherein:
M is ruthenium or osmium,
X is an alkylidene ligand with basicity higher than that of tricyclohexylphosphine ($PCy_3$),
Z is oxygen (O) or sulfur (S)
$X^2$ and $X^3$ are either the same or different and are any anionic ligand,
$R^4$ is a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylamino, $C_1$–$C_{20}$ alkylsulfonyl and $C_1$–$C_{20}$ alkylsulfinyl, wherein each of the substituents is substituted or unsubstituted, and
$R^5$, a, b, c, and d are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted.

41. The composition of claim 40 wherein the cycloolefin groups are selected from the group consisting of norbornenyl, norbornenylethyl, cyclopentenyl, 7-oxanorbornenyl, norbornadienyl, and 7-oxanorbornadienyl.

42. The composition of claim 40 wherein M is ruthenium; X is an imidazolidene ligand with basicity higher than that of tricyclohexylphosphine; $X^2$ and $X^3$ are halogen atoms; Z is oxygen; $R^4$ is a $C_1$ to $C_{10}$ alkyl fragment; a, b, c and d are each hydrogen, a $C_1$ to $C_{10}$ alkyl, or a $C_1$ to $C_{10}$ alkoxy group; and $R^5$ is hydrogen.

43. The composition of claim 40 wherein M is ruthenium; X is 1,3-bis(2,4,6-trimethylphenyl)-imidazol-2-ylidene; $X^2$ and $X^3$ are chlorine atoms; Z is oxygen; $R^4$ is 2-propyl; a, b, c and d are each either hydrogen or methoxy; and $R^5$ is hydrogen.

44. The composition of claim 40 wherein the solvent is a siloxane substituted with alkyl groups and with arylalkyl or aryl groups.

45. The composition of claim 44 wherein the solvent is a phenyl trimethicone.

* * * * *

UNITED STATES PATENT AND TRADEMARK OFFICE
CERTIFICATE OF CORRECTION

PATENT NO. : 7,001,590 B1
APPLICATION NO. : 10/988881
DATED : February 21, 2006
INVENTOR(S) : Christos Angeletakis It is certified that error appears in the above-identified patent and that said Letters Patent is hereby corrected as shown below:

Col. 1, line 21, "the disclosure of" should read --the disclosures of--.

Col. 7, line 13, "O or Z" should read --Q or Z--.

Col. 10, line 1, " 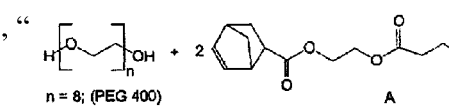 " should read

-- 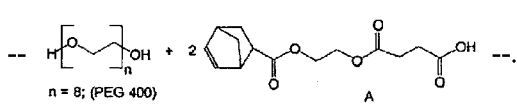 --.

Col. 11, line 40, "  " should read -- 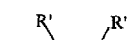 --.

Col. 15, line 32, "triple bonds" should read --triple bond--.

Col. 16, lines 1-8, "In the embodiment of the present invention where G is:

a structure is formed having 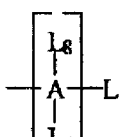 a chain of single-bonded Group" should read --In the embodiment of the present invention where G is:

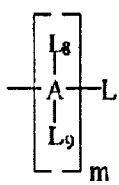

a structure is formed having a chain of single-bonded Group--.

UNITED STATES PATENT AND TRADEMARK OFFICE
CERTIFICATE OF CORRECTION

PATENT NO. : 7,001,590 B1
APPLICATION NO. : 10/988881
DATED : February 21, 2006
INVENTOR(S) : Christos Angeletakis It is certified that error appears in the above-identified patent and that said Letters Patent is hereby corrected as shown below:

Col. 21, line 43, "through" should read --though--.

Col. 24, lines 57-62, "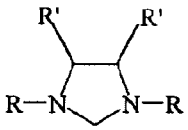" should read --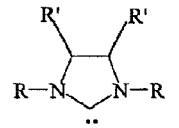--.

Col. 27, line 52, "dissolved in a catalyst solvent" should read --dissolved in a solvent--.

Signed and Sealed this

Tenth Day of October, 2006

JON W. DUDAS
*Director of the United States Patent and Trademark Office*